(12) United States Patent
Reed et al.

(10) Patent No.: US 12,433,654 B2
(45) Date of Patent: Oct. 7, 2025

(54) LISFRANC RECONSTRUCTION DEVICE, KIT, AND METHOD

(71) Applicant: Medline Industries, LP, Northfield, IL (US)

(72) Inventors: Wesley Reed, Libertyville, IL (US); Ryan Niver, Glenview, IL (US); Samuel Nader, Arlington Heights, IL (US); Scott Goldstein, Deerfield, IL (US); Dinesh Koka, Winter Park, FL (US)

(73) Assignee: Medline Industries, LP, Northfield, IL (US)

( * ) Notice: Subject to any disclaimer, the term of this patent is extended or adjusted under 35 U.S.C. 154(b) by 345 days.

(21) Appl. No.: 18/107,373

(22) Filed: Feb. 8, 2023

(65) Prior Publication Data

US 2024/0261010 A1     Aug. 8, 2024

(51) Int. Cl.
  *A61B 17/86*   (2006.01)
  *A61B 17/28*   (2006.01)
  *A61B 17/68*   (2006.01)

(52) U.S. Cl.
  CPC .... *A61B 17/864* (2013.01); *A61B 2017/2837* (2013.01); *A61B 2017/2845* (2013.01); *A61B 2017/681* (2013.01)

(58) Field of Classification Search
  CPC .......... A61B 17/864; A61B 2017/2837; A61B 2017/2845; A61B 2017/681
  See application file for complete search history.

(56) References Cited

U.S. PATENT DOCUMENTS

| 4,750,492 A | 6/1988 | Jacobs |
| 5,306,301 A | 4/1994 | Graf |

(Continued)

FOREIGN PATENT DOCUMENTS

| DE | 4343117 | 6/1995 |
| WO | 2005018472 | 3/2005 |

OTHER PUBLICATIONS

Screenshots from Facebook, Wright Medical, https://www.facebook.com/WrightMedical/videos/charlotte-lisfranc-reconstruction-system-animation/1419857841359191/, Nov. 23, 2016, Retrieved Feb. 9, 2023.

(Continued)

*Primary Examiner* — Zade Coley
*Assistant Examiner* — Diana Jones
(74) *Attorney, Agent, or Firm* — Fitch, Even, Tabin & Flannery LLP

(57) ABSTRACT

A Lisfranc reconstruction device includes a pair of operator grips mechanically linked to a first arm that includes a barrel and a second arm that includes a jaw whereby motion of the grips is mechanically transformed into relative translation of the barrel and the jaw for compression of a portion of a Lisfranc joint complex therebetween. The device includes a retention mechanism, such as a ratchet, to enable retention of the barrel and jaw when the desired position has been reached. The device may be provided in the form of a kit that includes a wire guide sleeve, a pilot wire, and a Lisfranc screw, in particular a cannulated Lisfranc screw that is sized to travel over the wire in a defined trajectory to facilitate proper screw placement. The device may be used for reconstruction of a traumatic injury to the Lisfranc joint complex.

23 Claims, 22 Drawing Sheets

(56) References Cited

U.S. PATENT DOCUMENTS

| | | |
|---|---|---|
| 5,709,686 A | 1/1998 | Talos |
| 5,921,986 A | 7/1999 | Bonutti |
| 6,110,207 A | 8/2000 | Eichhorn |
| 6,117,160 A | 9/2000 | Bonutti |
| 6,454,769 B2 | 9/2002 | Wagner |
| 6,517,578 B2 | 2/2003 | Hein |
| 6,635,072 B1 | 10/2003 | Ramamurti |
| 6,716,218 B2* | 4/2004 | Holmes .............. A61B 17/8866 606/105 |
| 6,821,278 B2 | 11/2004 | Frigg |
| 6,955,677 B2 | 10/2005 | Dahners |
| D520,637 S | 5/2006 | Kay |
| 7,309,340 B2 | 12/2007 | Fallin |
| 7,695,503 B1 | 4/2010 | Kaiser |
| 7,744,598 B2* | 6/2010 | Brumfield ................ B25B 7/02 606/86 A |
| 7,776,039 B2 | 8/2010 | Bernstein |
| 7,776,074 B2* | 8/2010 | Bray ................ A61B 17/7088 606/279 |
| 7,875,057 B2 | 1/2011 | Cook |
| 7,875,058 B2 | 1/2011 | Holmes, Jr. |
| 7,901,431 B2 | 3/2011 | Shurnas |
| 7,938,847 B2 | 5/2011 | Fanton |
| 7,955,364 B2 | 6/2011 | Ziolo |
| D648,027 S | 11/2011 | Vancelette |
| 8,133,258 B2 | 3/2012 | Foerster |
| 8,137,351 B2 | 3/2012 | Prandi |
| 8,206,446 B1 | 6/2012 | Montgomery |
| 8,216,242 B2 | 7/2012 | Marchyn |
| 8,231,654 B2 | 7/2012 | Kaiser |
| 8,313,492 B2 | 11/2012 | Wong |
| 8,343,196 B2 | 1/2013 | Schneider |
| 8,388,655 B2 | 3/2013 | Fallin |
| 8,529,608 B2 | 9/2013 | Terrill |
| 8,545,535 B2 | 10/2013 | Hirotsuka |
| 8,696,716 B2 | 4/2014 | Kartalian |
| 8,764,763 B2 | 7/2014 | Wong |
| 8,845,698 B2 | 9/2014 | Schneider |
| 8,852,245 B2 | 10/2014 | Schneider |
| 8,876,873 B2 | 11/2014 | Schneider |
| 8,906,076 B2 | 12/2014 | Mocanu |
| 8,940,026 B2 | 1/2015 | Hilse |
| 9,005,245 B2 | 4/2015 | Thornes |
| 9,011,540 B1 | 4/2015 | Castro |
| D740,943 S | 10/2015 | Neufeld |
| 9,259,217 B2 | 2/2016 | Fritzinger |
| 9,295,505 B2 | 3/2016 | Schneider |
| D756,844 S | 5/2016 | Almes |
| 9,351,776 B2 | 5/2016 | Terrill |
| D766,439 S | 9/2016 | Dacosta |
| 9,463,034 B2 | 10/2016 | Wong |
| 9,468,479 B2 | 10/2016 | Marotta |
| 9,486,264 B2 | 11/2016 | Reiley |
| 9,492,201 B2 | 11/2016 | Reiley |
| D780,922 S | 3/2017 | Dacosta |
| D780,926 S | 3/2017 | Dacosta |
| 9,662,157 B2 | 5/2017 | Schneider |
| 9,750,515 B2 | 9/2017 | Soliman |
| 9,763,716 B2 | 9/2017 | Terrill |
| 9,839,448 B2 | 12/2017 | Reckling |
| 9,936,983 B2 | 4/2018 | Mesiwala |
| 9,949,843 B2 | 4/2018 | Reiley |
| 10,010,321 B2 | 7/2018 | Cocaign |
| 10,022,138 B2 | 7/2018 | Wong |
| 10,130,358 B2 | 11/2018 | Palmer |
| 10,166,033 B2 | 1/2019 | Reiley |
| 10,201,427 B2 | 2/2019 | Mauldin |
| 10,206,670 B2 | 2/2019 | Thornes |
| 10,245,085 B2 | 4/2019 | Terrill |
| 10,245,086 B2 | 4/2019 | Treace |
| 10,245,088 B2 | 4/2019 | Dayton |
| 10,251,686 B2 | 4/2019 | Zajac |
| 10,292,745 B2 | 5/2019 | Palmer |
| 10,349,931 B2 | 7/2019 | Stone |
| 10,363,140 B2 | 7/2019 | Mauldin |
| 10,376,206 B2 | 8/2019 | Sand |
| D869,657 S | 12/2019 | Hollis |
| D891,619 S | 7/2020 | Hollis |
| 11,103,293 B2 | 8/2021 | Palmer |
| D932,012 S | 9/2021 | Dacosta |
| 11,109,855 B2 | 9/2021 | Shoshtaev |
| 11,266,451 B2 | 3/2022 | Hollis |
| 11,272,967 B2 | 3/2022 | Niver |
| 11,382,671 B2* | 7/2022 | Hayes ................ A61B 17/7079 |
| 11,426,154 B2 | 8/2022 | Niver |
| 11,602,383 B2 | 3/2023 | Palmer |
| 11,602,384 B2 | 3/2023 | Palmer |
| 2002/0161439 A1 | 10/2002 | Strobel |
| 2003/0236555 A1 | 12/2003 | Thornes |
| 2006/0166535 A1* | 7/2006 | Brumfield ................ B25B 7/18 439/179 |
| 2008/0051786 A1 | 2/2008 | Jensen |
| 2008/0208252 A1 | 8/2008 | Holmes |
| 2009/0210010 A1 | 8/2009 | Strnad |
| 2009/0306675 A1* | 12/2009 | Wong ..................... A61B 17/66 606/102 |
| 2010/0268273 A1 | 10/2010 | Albertorio |
| 2011/0009866 A1 | 1/2011 | Johnson |
| 2012/0123484 A1 | 5/2012 | Lietz |
| 2013/0030480 A1 | 1/2013 | Donate |
| 2013/0035720 A1 | 2/2013 | Perriello |
| 2014/0257294 A1 | 9/2014 | Gédet |
| 2016/0310191 A1 | 10/2016 | Seykora |
| 2017/0156767 A1 | 6/2017 | Chaudot |
| 2017/0209193 A1 | 7/2017 | Hartdegen |
| 2018/0008255 A1 | 1/2018 | Fallin |
| 2018/0249998 A1 | 9/2018 | Chavan |
| 2018/0280066 A1 | 10/2018 | O'Connor |
| 2020/0015871 A1 | 1/2020 | Niver |
| 2020/0305938 A1 | 10/2020 | Krumme |
| 2021/0068806 A1 | 3/2021 | Niver |
| 2021/0361333 A1 | 11/2021 | Palmer |
| 2022/0160408 A1 | 5/2022 | Hollis |
| 2022/0226028 A1 | 7/2022 | Dayton |
| 2022/0265330 A1 | 8/2022 | Niver |
| 2022/0296287 A1 | 9/2022 | Hollis |

OTHER PUBLICATIONS

Wright Medlical, "Charlotte Lisfranc Reconstruction System" brochure, Sep. 16, 2016, 13 pages.

"Dynamic and Load-to-Failure Testing of the DePuy Synthes Fibulink® Syndesmosis Repair System and Arthrex Syndesmosis TightRope® XP Implant System";DePuy Synthes Research and Development, 2020 (3 pgs.).

"Fibulink® Syndesmosis Repair System Surgical Technique"; DePuy Synthes, 2021 (19 pgs.).

"Load-to-Failure and Cyclic Displacement of the Arthrex Knotless TightRope Syndesmosis and Biomet ZipTight™ Ankle Syndesmosis"; Arthrex Research and Development, 2013 (1 pg.).

"Syndesmosis TightRope® XP Implant System Surgical Technique"; Arthrex, Inc.; 2019 (7 pgs.).

"ZipTight™ Ankle Syndesmosis Surgical Technique"; Zimmer Biomet, 2019 (10 pgs.).

Acumed, Ankle Plating System 3 Brochure, Jun. 2022 (60 pages).
Arthrex Inc., Knotless TightRope, 2012.
Arthrex Inc., Lisfranc TightRope Fixation, 2013.
Arthrex Inc., PushLock, Knotless Instability Repair, 2013.
Arthrex Inc., TightRope Syndesmosis Fixation, 2012.
OsteoMed, "ExtremiLock Foot Plating System," published prior to 2017.
Stryker, "Stryker Foot & Ankle Plating Systems," Operative Technique Anchorage 2 CP, 2016.
Stryker, ReelX STT, Knotless Anchor System, 2015.
Wright, Piton, 3.5mm Knotless Fixation Implant, Jun. 27, 2016.
Zimmer Biomet, JuggerLoc Bone-to-Bone System for Ankle Syndesmosis Fixation, 2017.

\* cited by examiner

LISFRANC RECONSTRUCTION DEVICE, KIT, AND METHOD

FIELD

The disclosure relates to an orthopedic reconstruction device, in particular a Lisfranc reconstruction device, and a kit and method pertaining to same.

BACKGROUND

The Lisfranc joint complex is a region of the human foot that is subject to traumatic injury. Lisfranc injuries are common particularly among contact sports athletes. In one such injury, for example, the first metatarsal bone, which is not secured to the second metatarsal bone via any connective tissue, becomes dislodged or broken. In some cases, repair of such injury requires fusion of the first metatarsal bone to the second metatarsal bone. In general, Lisfranc reconstructive surgeries require that the Lisfranc joint complex be held firmly in place under compression while an implement is inserted for compression. The implement is typically a Lisfranc screw, which is a bone screw intended for permanent retention within the patient's foot. The compression required to place such implement may be applied using conventional surgical clamps or with a specialized bracket.

A Lisfranc reconstruction device is now provided. The device has first and second manually compressible operator grips, a barrel, and a jaw and is configured to cause relative axial translation of the barrel and jaw in response to manual compression of the grips. The device may include first and second operator grips that may be moved relative to one another upon manual compression by the operator, who typically is the surgeon performing the reconstructive surgery. The grips may be movable in an arcuate path. The grips are mechanically linked to a first arm that includes a barrel and a second arm that includes a jaw. The mechanical linkage is designed such that the arcuate motion of the grips is mechanically transformed into relative translation of the barrel and the jaw. The mechanical linkage may be, for instance, a multi bar linkage that includes two prismatic joints. The device is equipped with a retention mechanism, such as a ratchet mechanism, that retains the relative position of the barrel and jaw relative to one another when the desired degree of compression has been reached. The device may be used to compress and retain a portion or all of the Lisfranc joint complex between the barrel and jaw for subsequent placement of a Lisfranc screw or other implement. For example, a Lisfranc screw may be inserted through the barrel.

The device may be supplied in the form of a kit that includes, in addition to the above-described device, a wire guide sleeve, a pilot wire, and an implement such as aa Lisfranc screw, which may be a solid screw or a cannulated Lisfranc screw that slides over the pilot wire. The kit may optionally include other components, such as a driver bit sized for engagement with the screw. In using the device and kit with a Lisfranc screw, the surgeon positions the device in place to compress all or a portion of the Lisfranc joint complex and actuates the device by compressing the grips to cause relative translation of the barrel and jaw. With the wire guide sleeve inserted and secured to the barrel, the pilot wire is used to create a pilot hole in the patient's bone at the position desired for placement of the screw. Subsequently, the wire guide sleeve is removed, and the Lisfranc screw is positioned proximal the pilot hole. If cannulated Lisfranc screw is used, it may be is positioned over the wire and guided over a trajectory defined by the pilot wire into the desired position. The surgeon then may screw the Lisfranc screw into bone to accomplish the reconstruction. After removal of the device, optional additional screws, plates, staples, or like may be installed as necessary. The device alone may be used to compress the Lisfranc joint complex for placement of other compression implements.

Also provided is a method of using a Lisfranc reconstruction device that includes first and second manually compressible operator grips, a barrel, and a jaw, the device configured to cause relative axial translation of the barrel and jaw in response to manual compression of the grips. The method includes positioning the jaw and barrel relative to one another in the region of a patient's Lisfranc joint complex in need of reconstruction and compressing the grips to cause relative translation of the barrel and jaw to thereby compress a portion of the Lisfranc joint complex therebetween.

Terms of orientation, such as "top," "side," and the like are for convenient reference to the Figures and are not meant to limit the orientation of the device when in use. In practice, the device may be oriented omnidirectionally.

DETAILED DESCRIPTION

Figure 1:
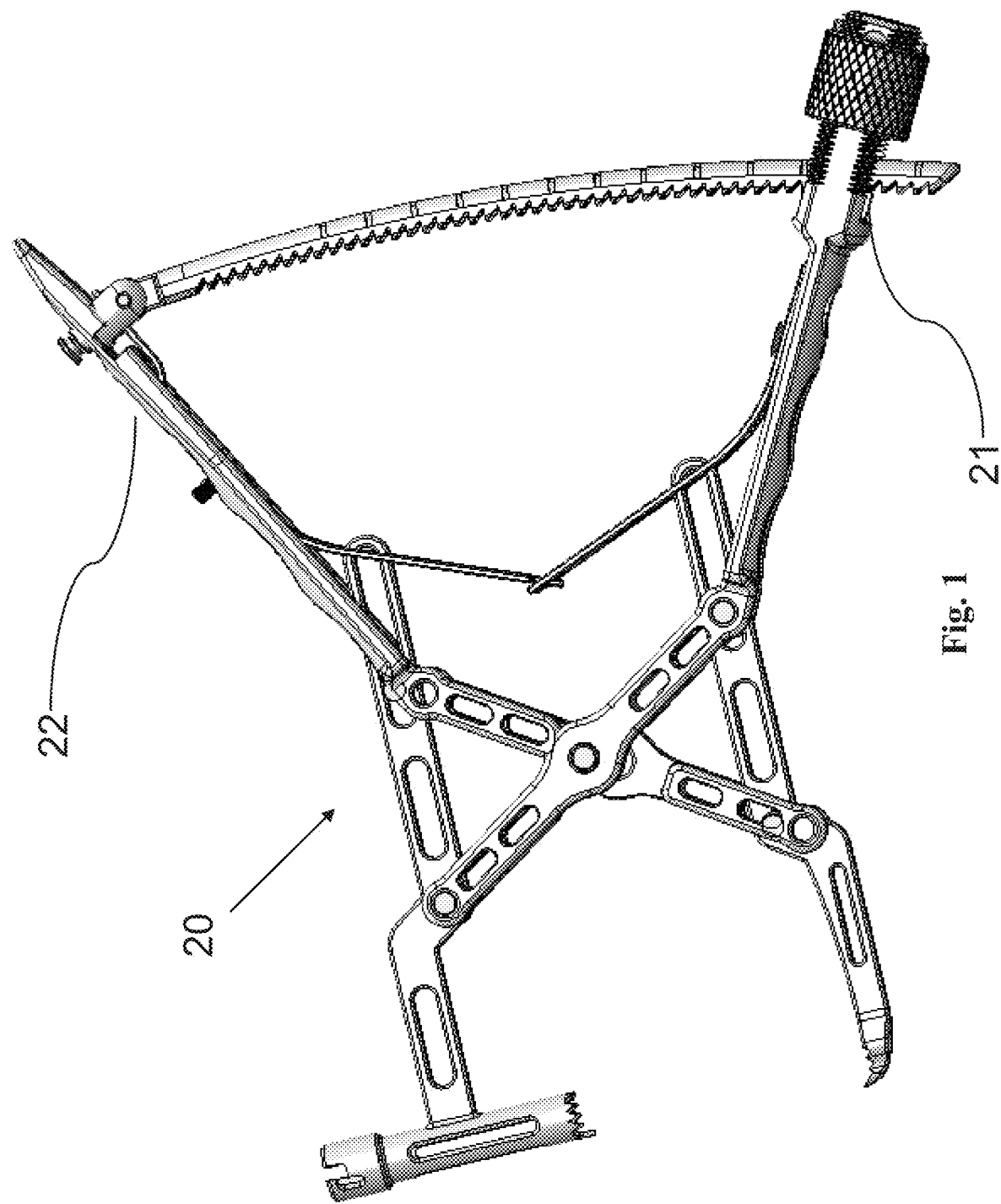
FIG. 1 is an isometric view of an exemplary Lisfranc reconstruction device according to the present teachings.
Figure 2:
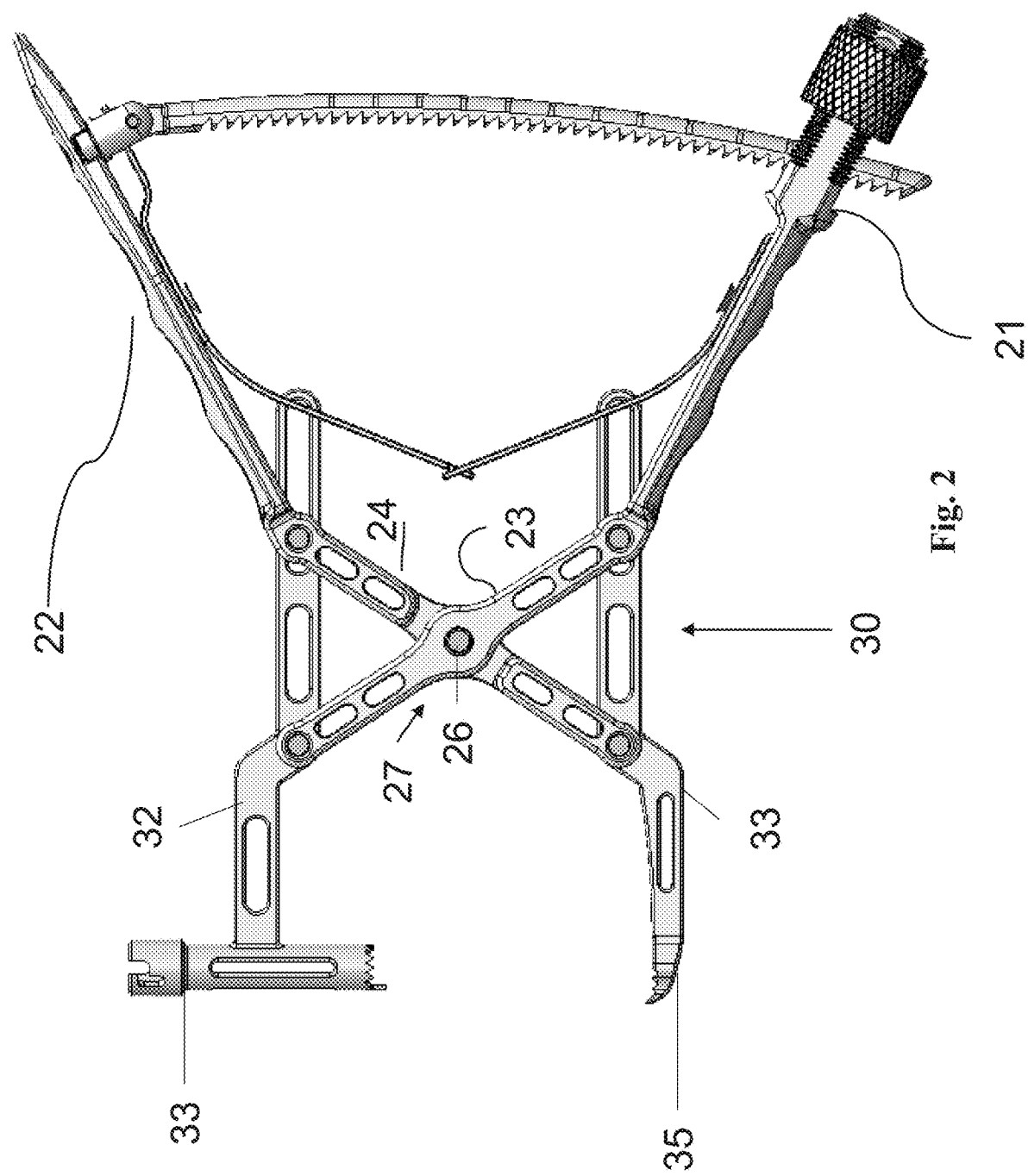
FIG. 2 is a first side elevation of the Lisfranc reconstruction device as shown in FIG. 1.
Figure 3:
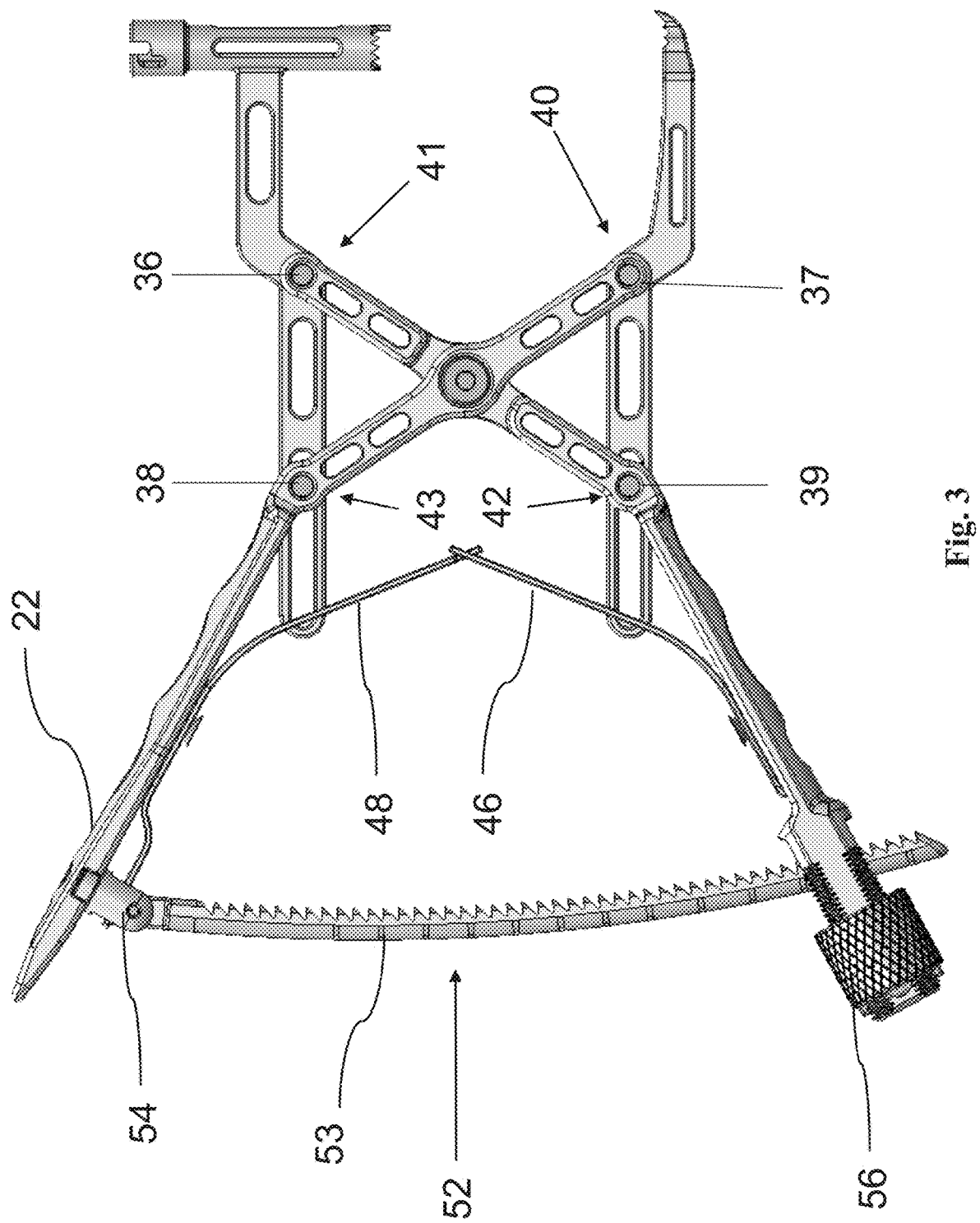
FIG. 3 is second side elevation of the Lisfranc reconstruction device shown in FIG. 1.
Figure 4:
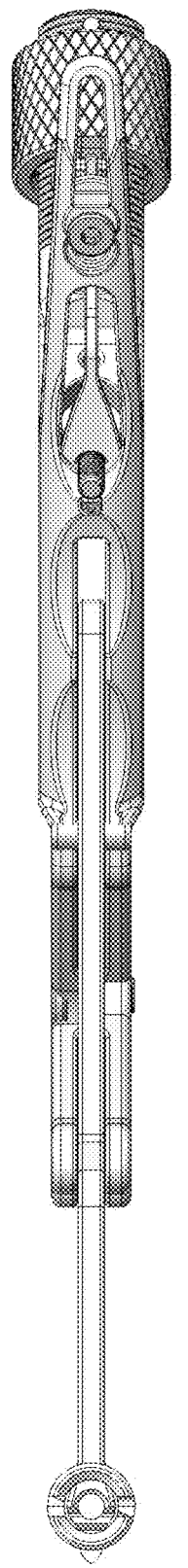
FIG. 4 is a top plan view of the Lisfranc reconstruction device shown in FIG. 1.
Figure 5:
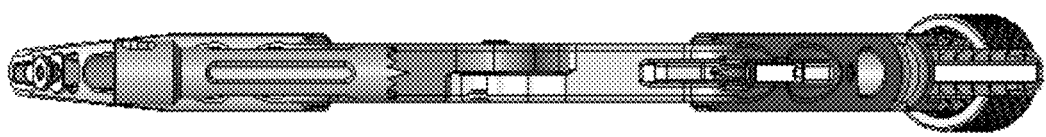
FIG. 5 is a front elevation of the Lisfranc reconstruction device shown in FIG. 1.

With reference to FIGS. 1 and 2, the device 20 includes first and second operator grips 21, 22 each connected to, and in the illustrated embodiment integral with, grip links 23, 24 respectively. The grip links are connected via pin 26 at a revolute joint 27, which forms a part of mechanical linkage 30. Mechanical linkage 30 further includes a first arm 32 that includes a barrel 33 and a second arm 34 that includes a jaw 35. With reference to FIG. 3, pins 36, 37, 38, 39 connect the grip link and arms respectively at revolute joints 40, 41 and prismatic joints 42, 43.

Figure 6:
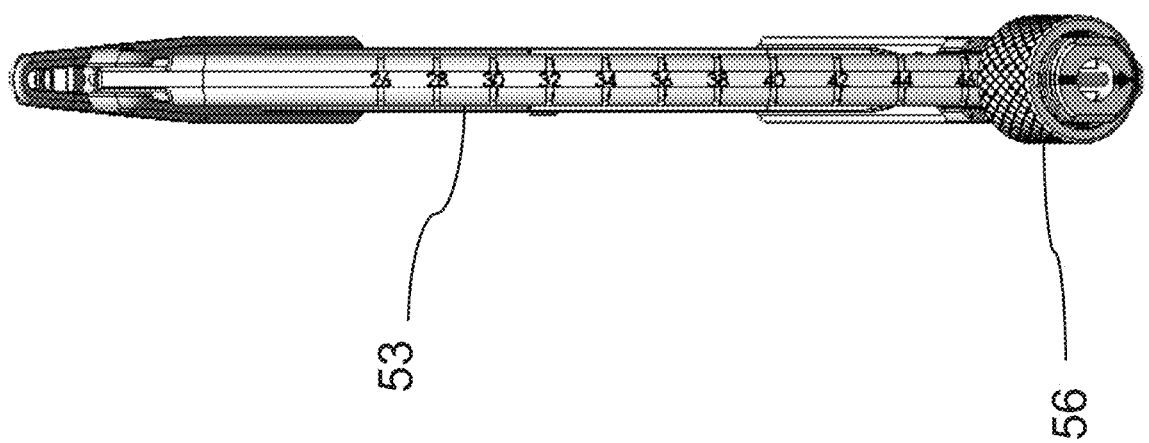
FIG. 6 is a rear elevation of the Lisfranc reconstruction device shown in FIG. 1.
Figure 7:
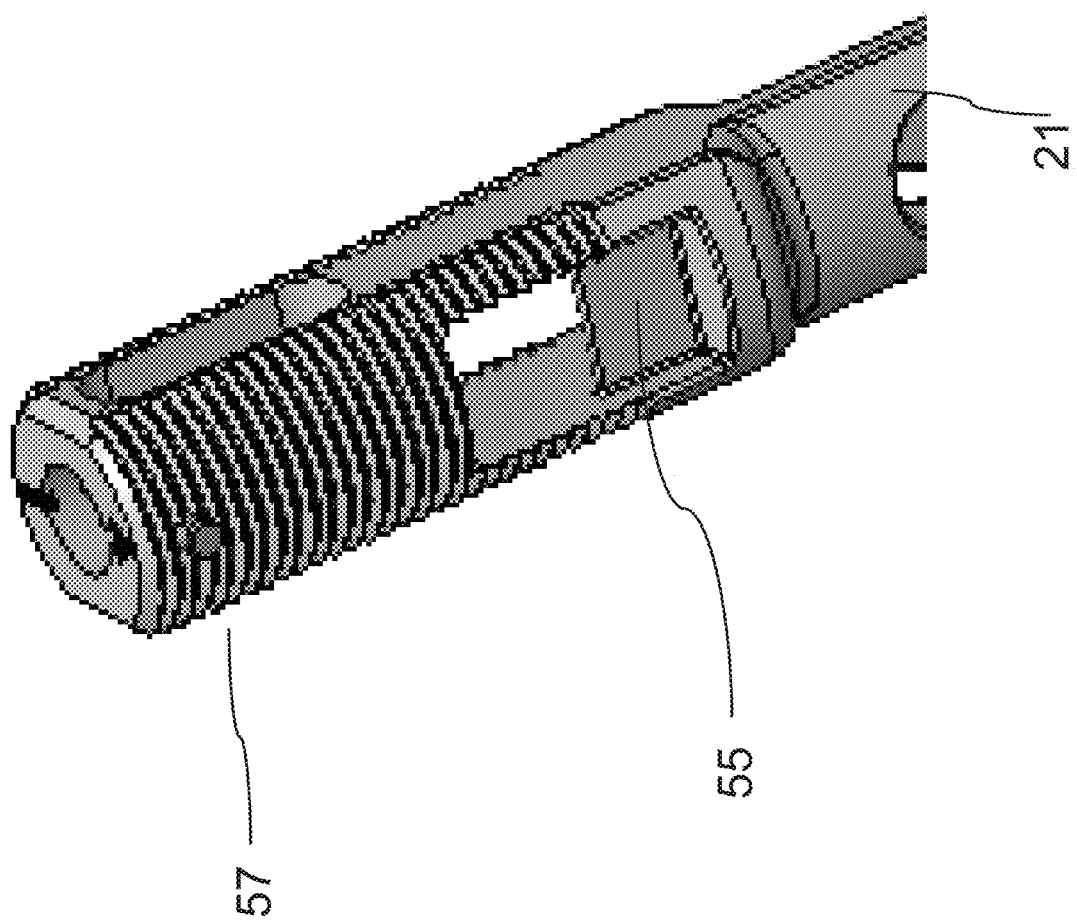
FIG. 7 is a relatively enlarged isometric view of the end of the second grip of the above-depicted device shown with the ratchet and knurled nut removed.

The device is normally biased open via a pair of leaf springs 46, 48. As seen in FIG. 3, the device includes a retention mechanism 52 for retaining the barrel and jaw in relative position, and in the illustrated embodiment which likewise maintains the grips in a compressed state. In the illustrated embodiment, the retention mechanism includes a curved, arcuate ratchet 53, one end of which is fastened via connector 54 to grip 22. With further reference to FIG. 7, the other end of the ratchet 53 cooperates with pawl portion 55 formed integrally with the second grip 21. The device is further equipped with a knurled locking nut 56 (FIGS. 3 and 6) which engaged threads 57 (FIG. 7) on the second grip 22 and which may be turned to secure and lock the ratchet 53 into place relative to the pawl portion 55. As seen in FIG. 6, the ratchet 53 may include graduation marks to inform the surgeon of the extent of compression.

Figure 8:
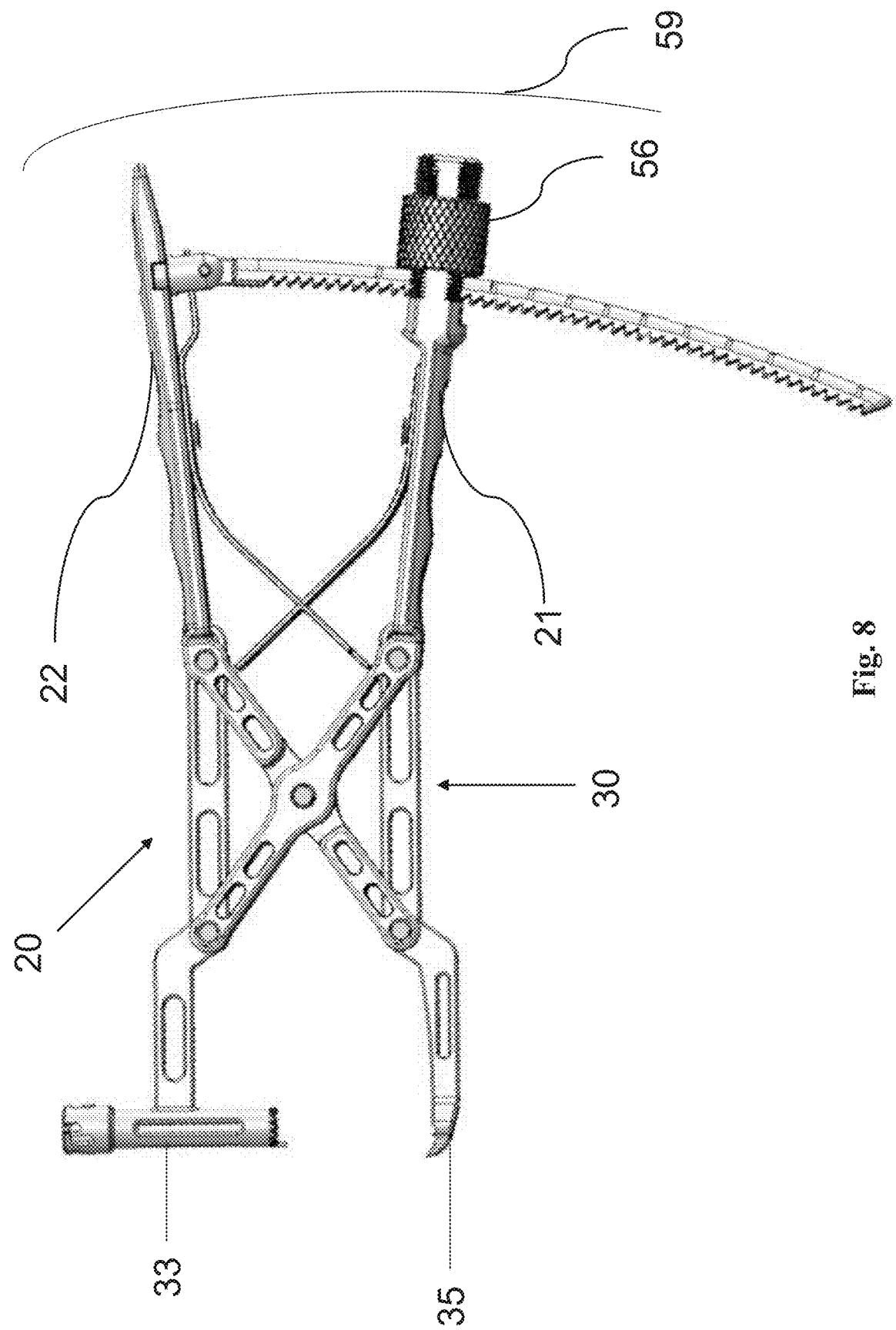
FIG. 8 is a first side elevation of the device shown in FIG. 1, shown upon compression of the grips and with the locking nut secured.

As seen with respect to FIG. 8, when the user has squeezed the grips 21, 22 together, via the mechanical linkage 30 the barrel 33 and jaw 35 are axially translated towards one another (compare the relative position of these in FIG. 2). This converts arcuate motion of the grips (generally along the path of the ratchet and as shown at arc 59) to axial translation of the barrel and jaw. With the locking nut 56 secured as shown in FIG. 8, the device 20 enables a portion of a Lisfranc joint complex to be compressed between the barrel 33 and jaw 35 after the surgeon has released the grips.

Figure 9:
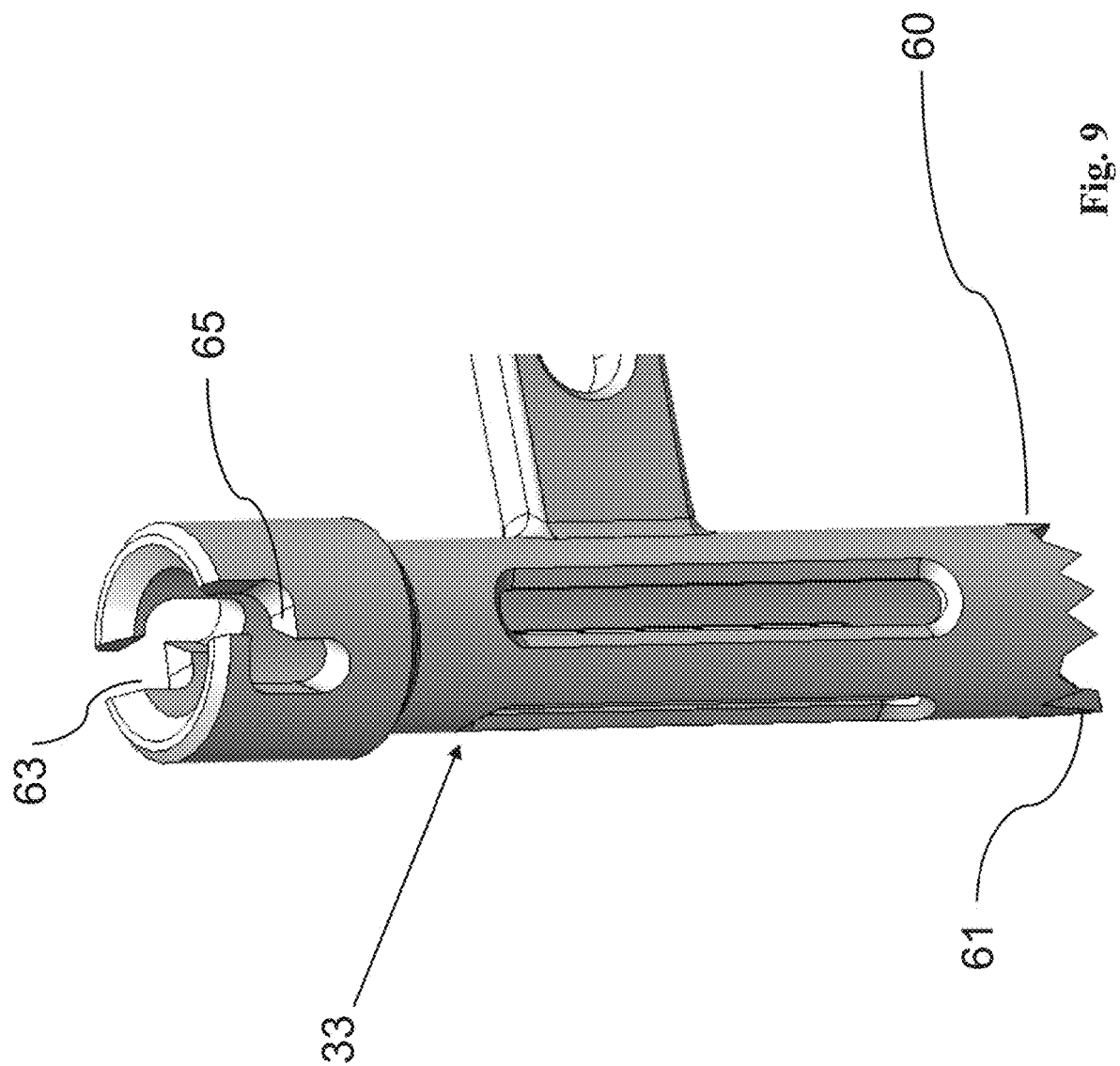
FIG. 9 is a relatively enlarged perspective view of the barrel of the device shown in FIG. 1.
Figure 10:
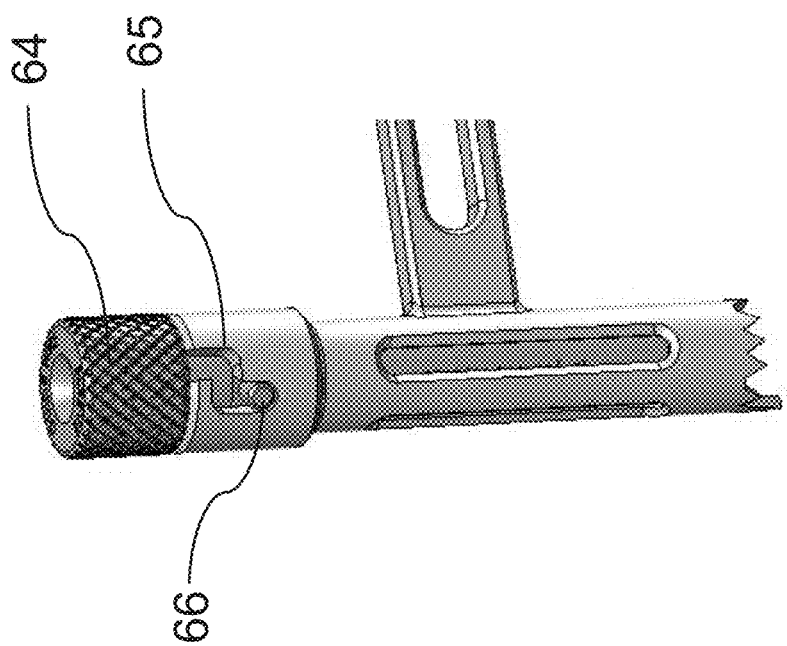
FIG. 10 is a view of the barrel shown in FIG. 9, shown with a wire guide sleeve inserted.

The jaw 35 is provided with a plurality of jaw teeth as seen in FIG. 3. Turning to FIG. 9, the barrel 33 includes a plurality of barrel teeth 60, one tooth 61 of which may be relatively larger than the others to facilitate in positioning the device. The barrel is provided with bayonet-like retention mechanism for a wire guide sleeve 64, shown in FIG. 10. The barrel includes a pair of slots 63, 65 (FIG. 9) that engage protruding pins of the wire guide sleeve, one of which is shown as pin 66 (FIG. 10), which cooperate with the slots 63 to removably secure the wire guide sleeve 64 to the barrel 33.

Figure 11:
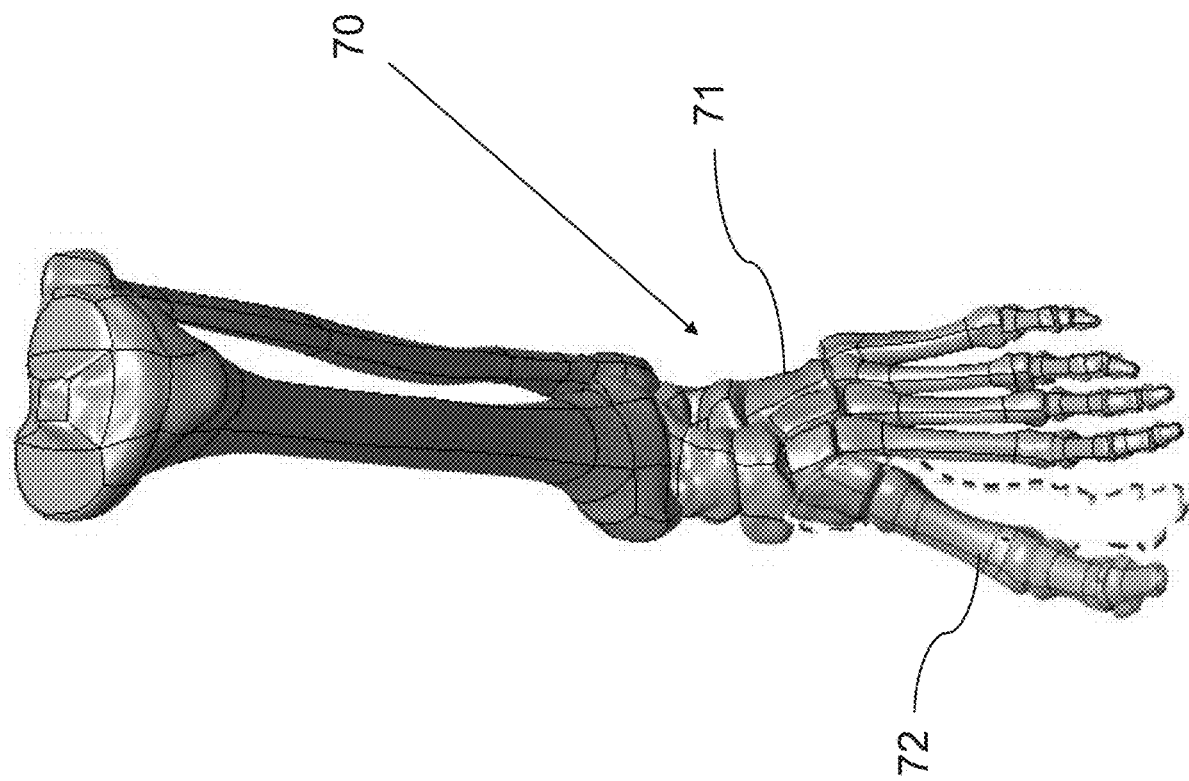
FIG. 11 is a perspective view of a foot in which the first metatarsal has become displaced from an injury.
Figure 12:
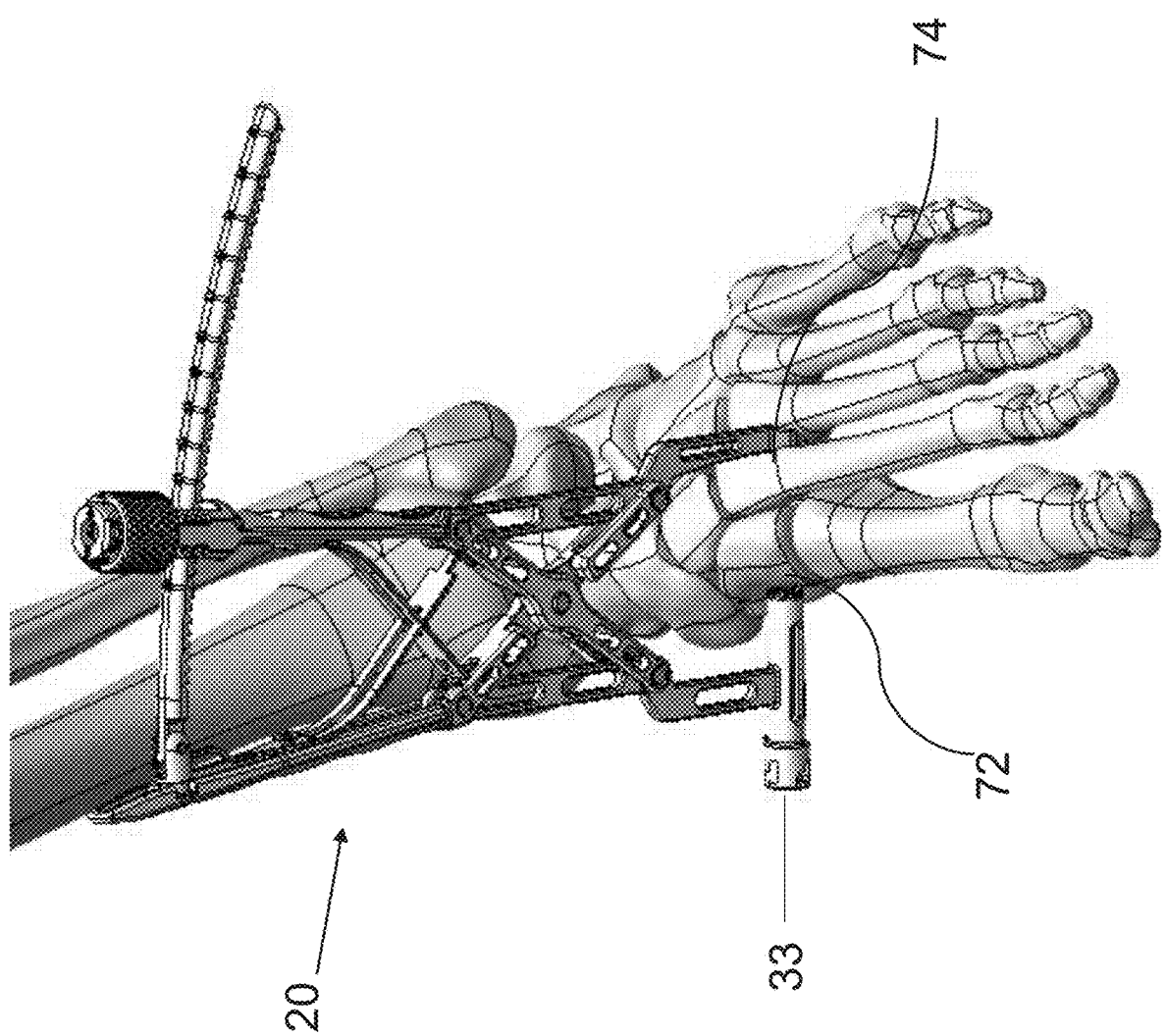
FIG. 12 is a perspective view of the device of FIG. 1 shown applied to the foot of FIG. 11, showing the device in a relatively compressed state.

In use, the device may be supplied with the wire guide sleeve secured to the barrel or with the wire guide sleeve first being separate from the barrel. As seen in FIG. 11, a patient's foot 70 includes a Lisfranc joint complex 71 in which the first metatarsal 72 has been dislodged. With reference to FIG. 12, the surgeon places the device 20 with the jaw 35 positioned behind the second metatarsal 74 and the barrel 33 adjacent to the first metatarsal 72. Via manual compression of the grips of the device, the surgeon compresses the Lisfranc joint complex 71 to properly position the first metatarsal relative to the second metatarsal, as seen in FIG. 12.

Figure 13:
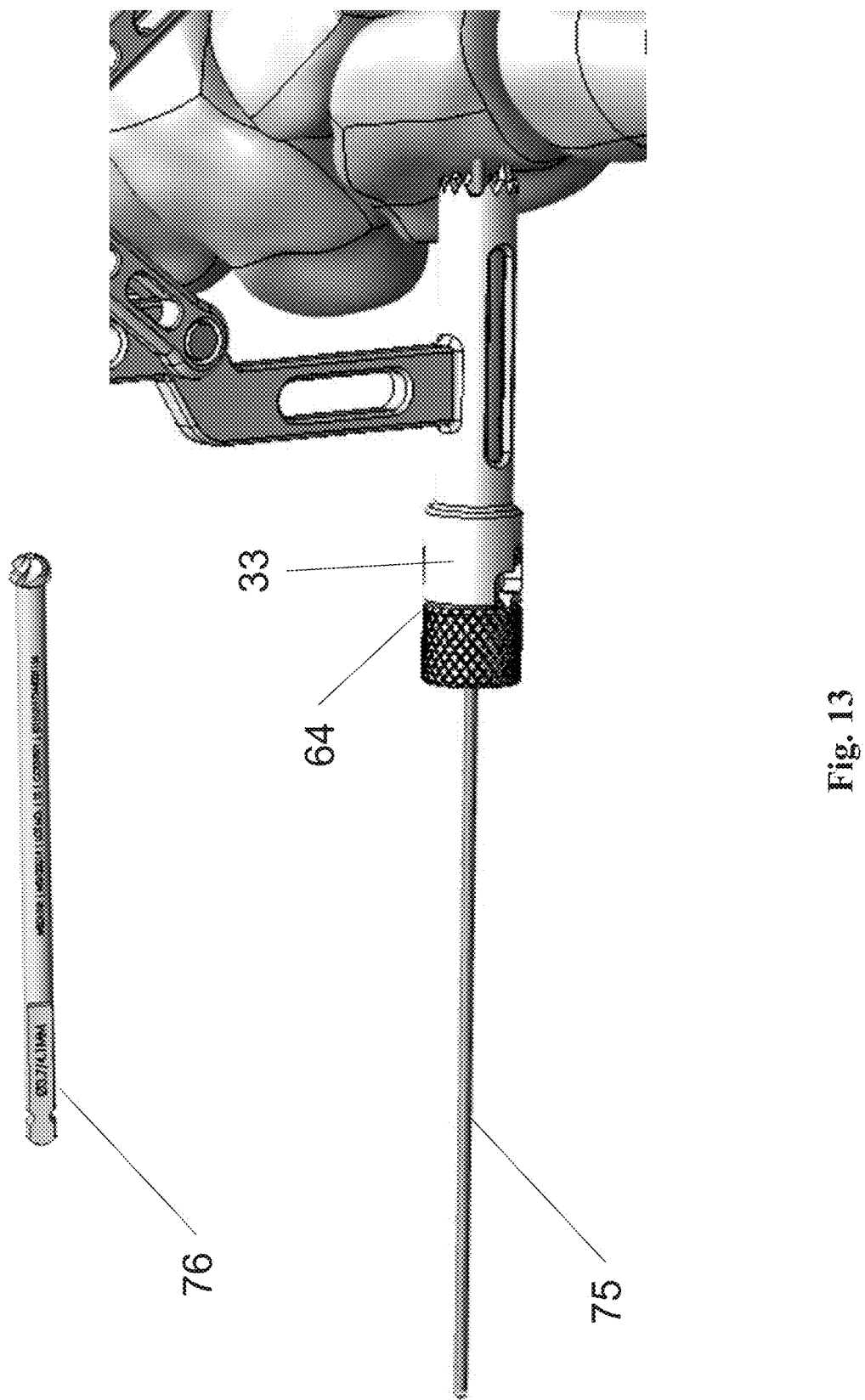
FIG. 13 is a relatively enlarged perspective view of the device and foot shown in FIG. 12, shown after the wire guide has been placed into the barrel and the pilot wire has been placed, and further illustrating an optional countersink.
Figure 14:
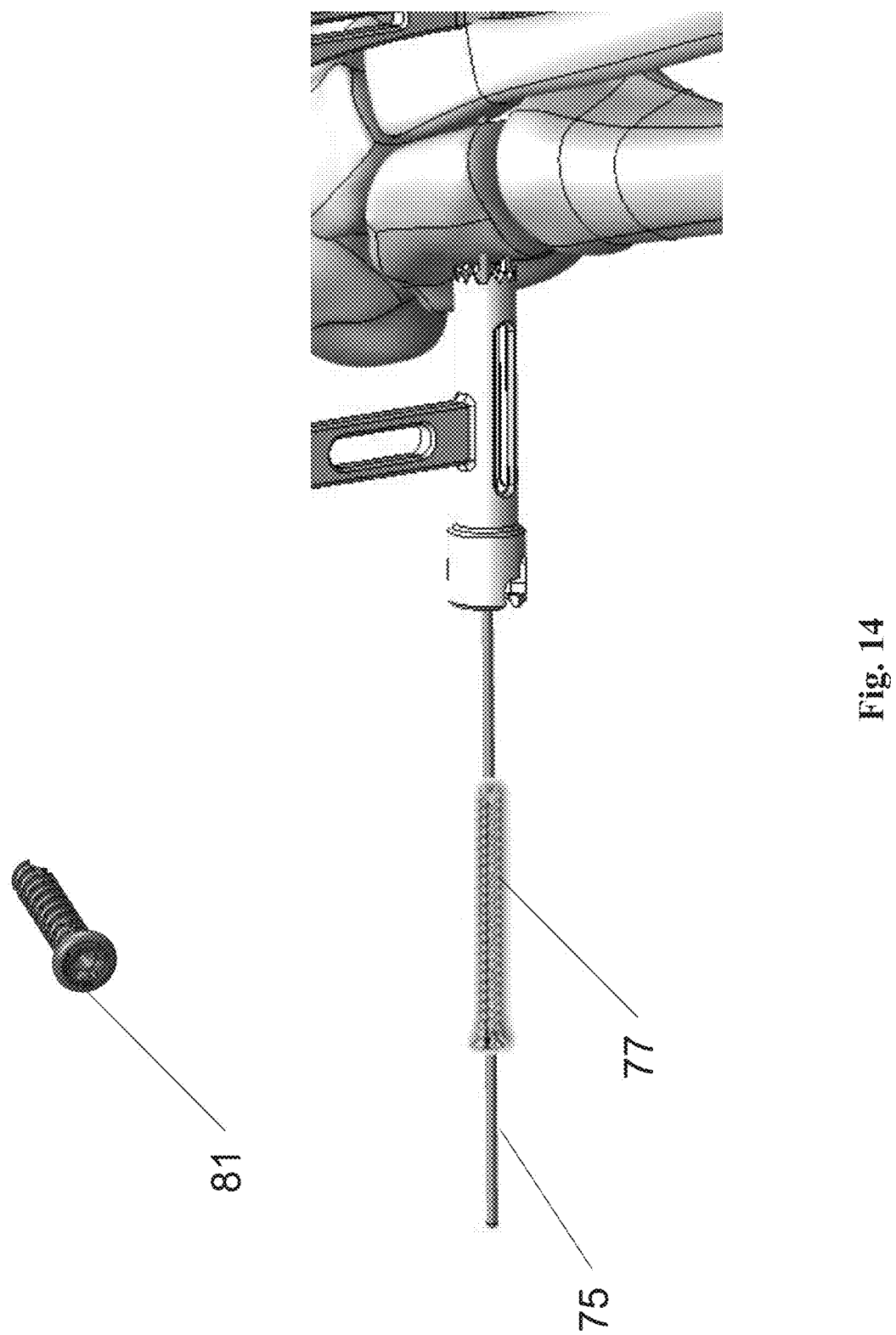
FIG. 14 is a view of the device and foot shown in FIGS. 12 and 13, shown after the wire guide has subsequently been removed and a cannulated Lisfranc screw placed over the pilot wire, and further illustrating an optional alternative solid Lisfranc screw.
Figure 15:
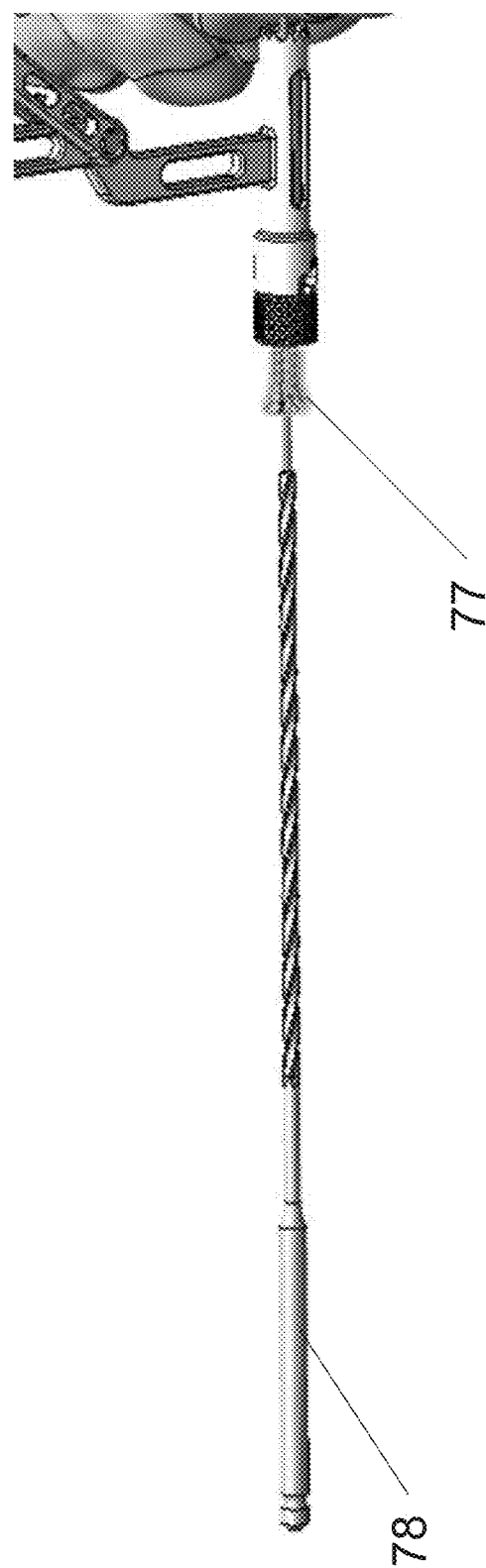
FIG. 15 is a view representing a cannulated drill bit being used to place the cannulated Lisfranc screw.

With reference to FIG. 13, the wire guide sleeve 64 and a pilot wire 75 are shown after insertion into the barrel 33. The assembly is ready for the surgeon to drill a pilot hole using the pilot wire. Once this has been done, as seen in FIG. 14, the wire guide is removed and optionally a countersink 76 is used to remove a small section of bone to accommodate the head of the Lisfranc screw. A Lisfranc screw is then positioned proximal the pilot hole. For example, cannulated Lisfranc screw 77 may be positioned over the pilot wire 75. A driver bit 78, which may be integral with screw tool or may be separately supplied for use with a surgical inserter, is then used to screw the Lisfranc screw into place (FIG. 15). The driver bit may be a cannulated driver bit which is placed over the guide wire for driving the screw. Alternatively, a solid Lisfranc screw 81 may be used.

Figure 16:
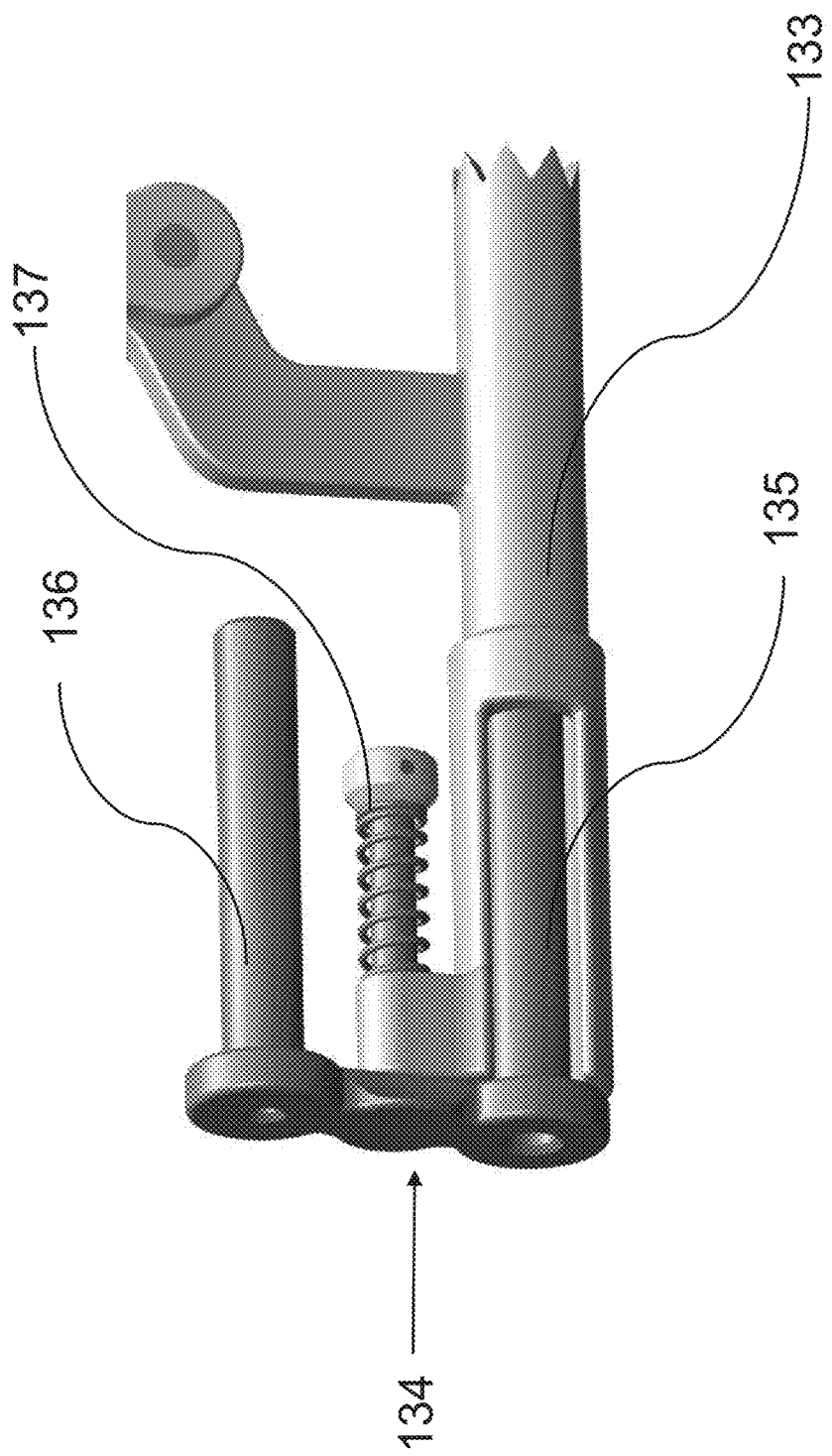
FIG. 16 is a is a relatively enlarged perspective view of an alternative barrel configuration.
Figure 17:
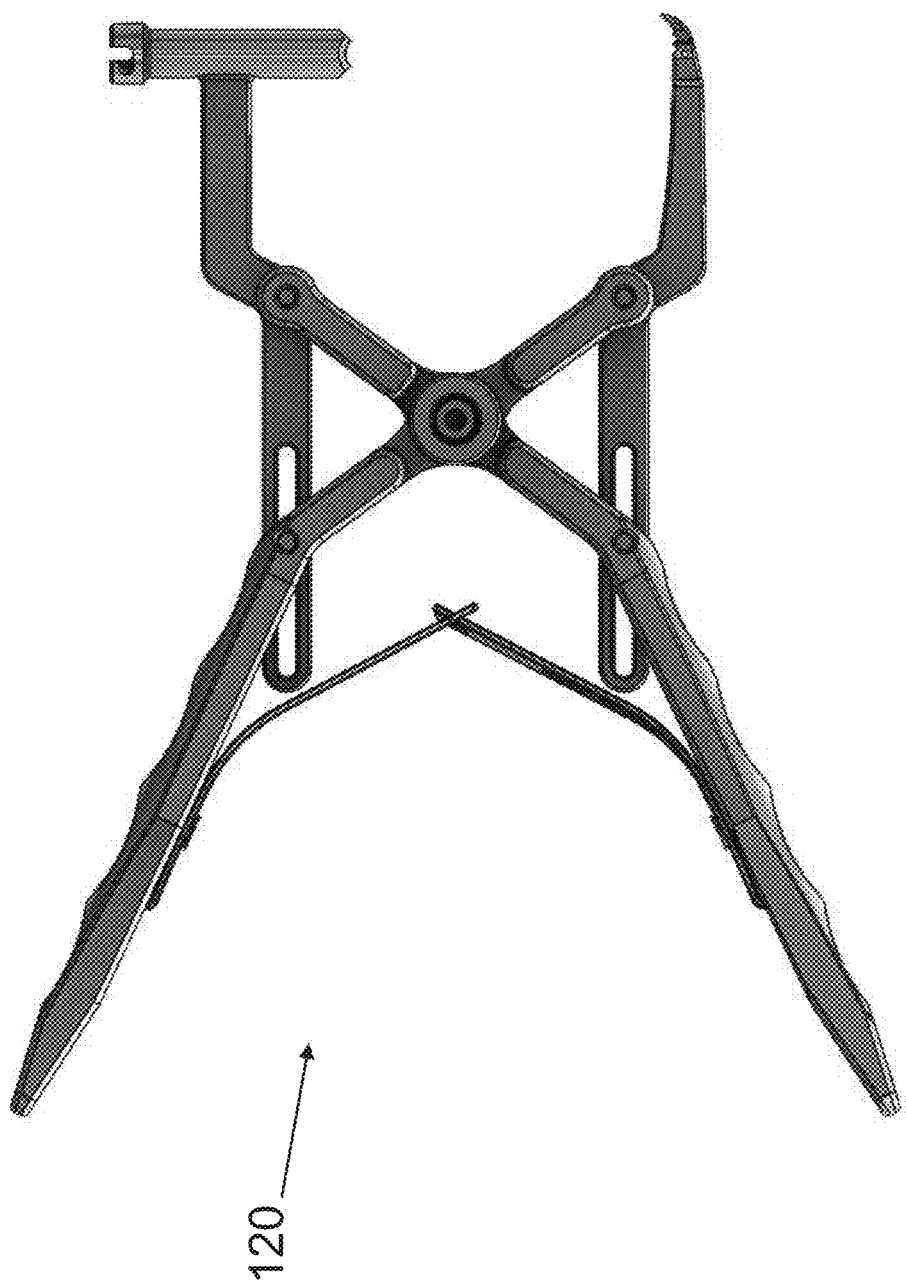
FIGS. 17-18 are side views of an alternative Lisfranc reconstruction device.
Figure 18:
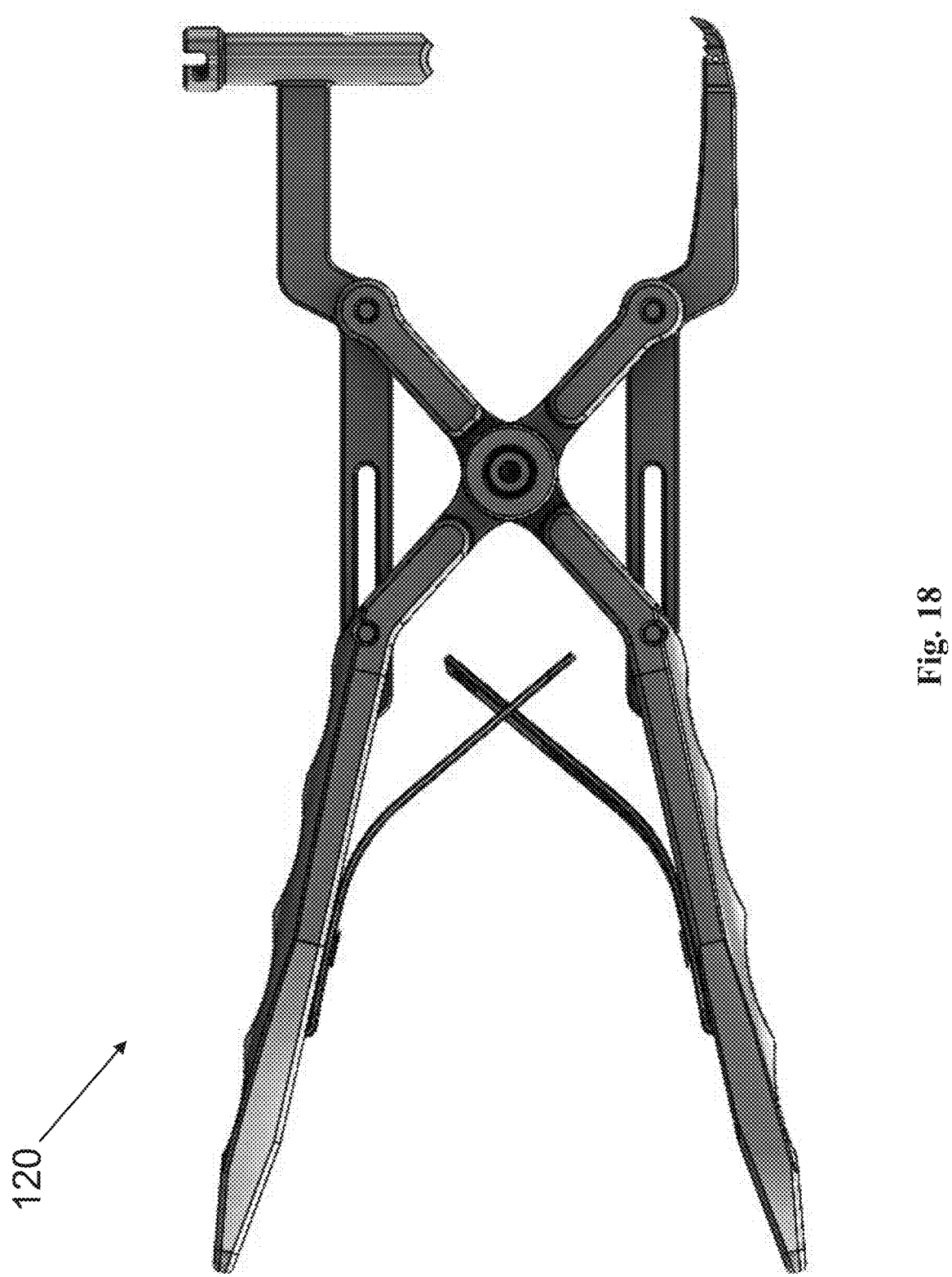
Figure 19:
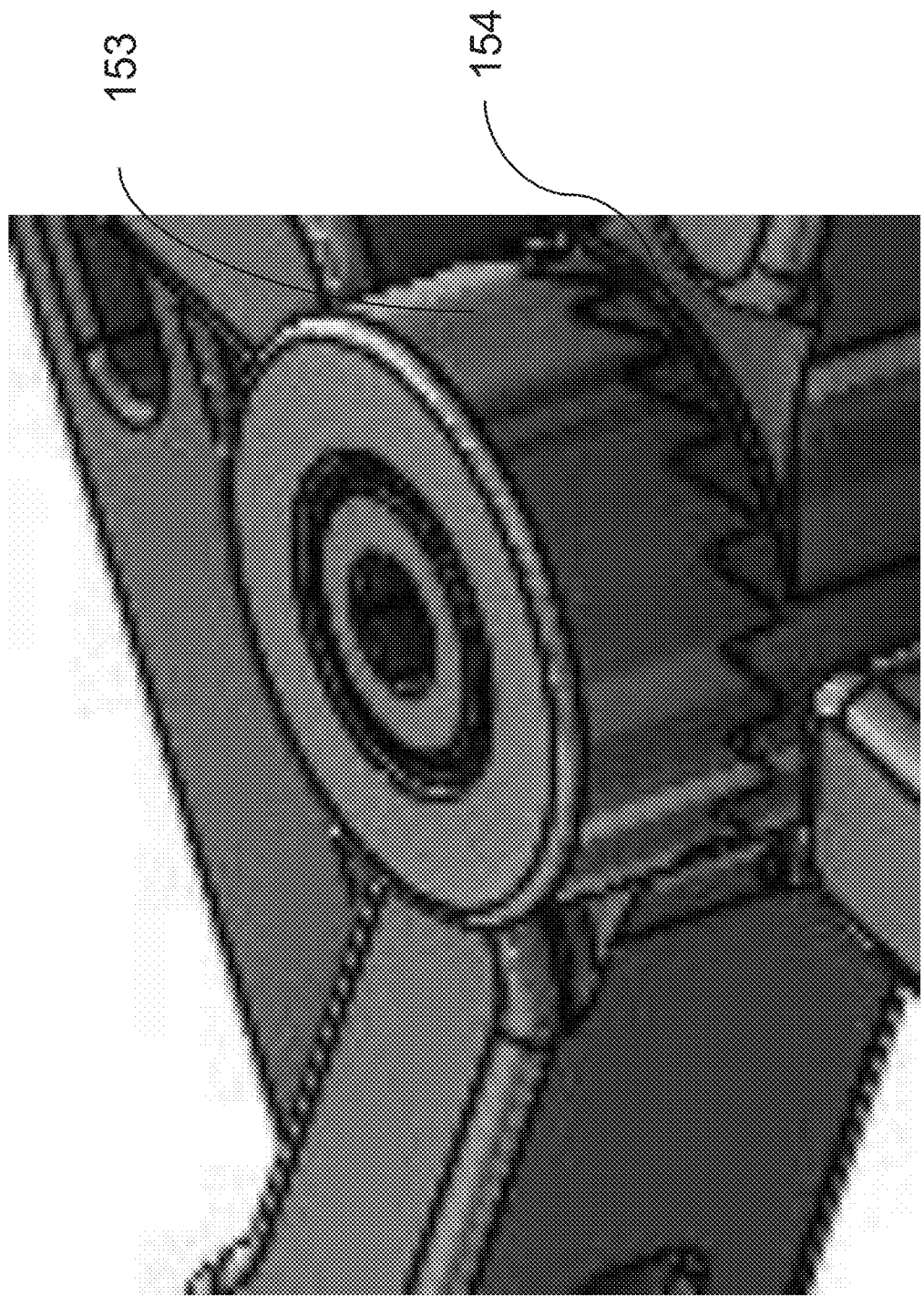
FIG. 19 is a relatively enlarged isometric view of the ratchet mechanism of the Lisfranc reconstruction device shown in FIGS. 17-18.
Figure 20:
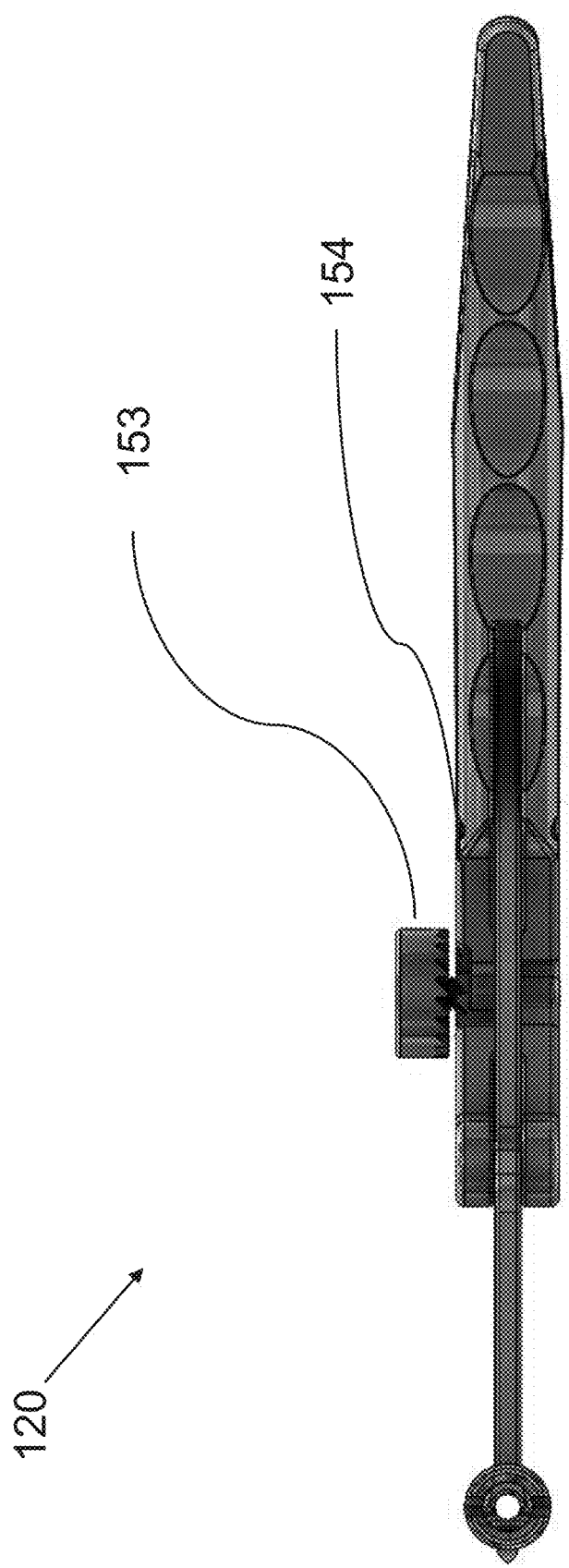
FIG. 20 is a bottom plan view of the Lisfranc reconstruction device shown in FIGS. 17-18, shown with the ratchet wheel disengaged.
Figure 21:
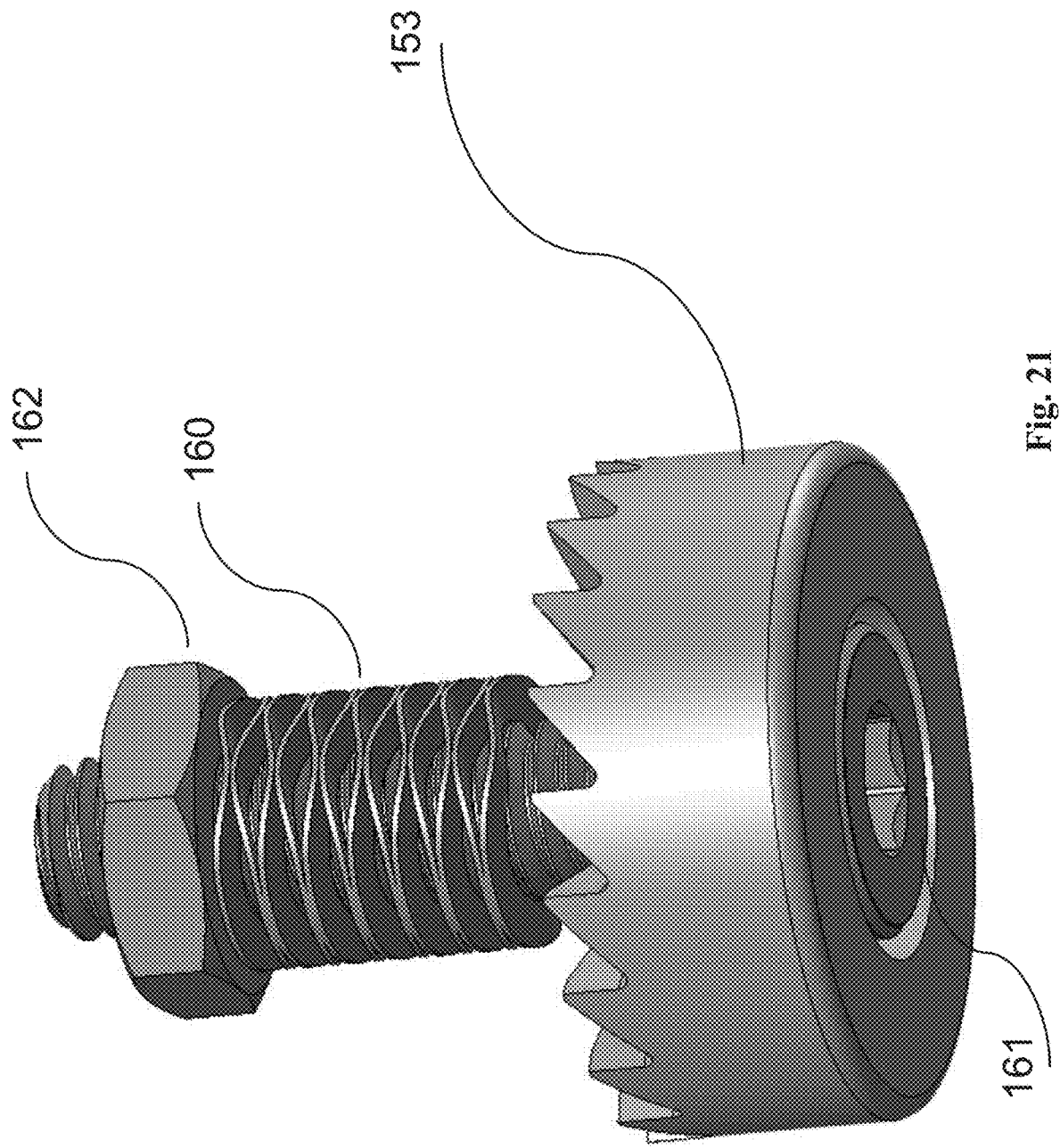
FIG. 21 is an isometric view showing detail of the spring load mechanism of the ratchet wheel of the Lisfranc reconstruction device shown in FIG. 20.

Certain alternative designs are provided herein. Alternative barrel 133, shown in FIG. 16, includes a rotating guide mechanism 134 that includes a screw guide 135 and a wire guide 136, the mechanism including a spring 137 for securement of the rotating guide mechanism 137 to the barrel 133. The operator may begin with the wire guide 136 positioned within the barrel 133 and may create a pilot hole using the wire. After removal of the wire, the operator may rotate the mechanism 134 to position the screw guide within the barrel 133 for placement of a Lisfranc screw. The alternative device 120 shown in FIGS. 17-20 has a ratchet wheel 153 (FIGS. 19-21) that cooperates with ratchet surface 154 to retain the compressed state of the device when engaged. As seen in FIG. 20, the ratchet wheel 153, which is captured via a spring load mechanism, may be manually separated from the ratchet surface to disengage the ratchet mechanism. The spring load mechanism (FIG. 21) includes wave disc spring 160, bolt 161, and nut 162 that capture the ratchet wheel within the device 120 when assembled.

Figure 22:
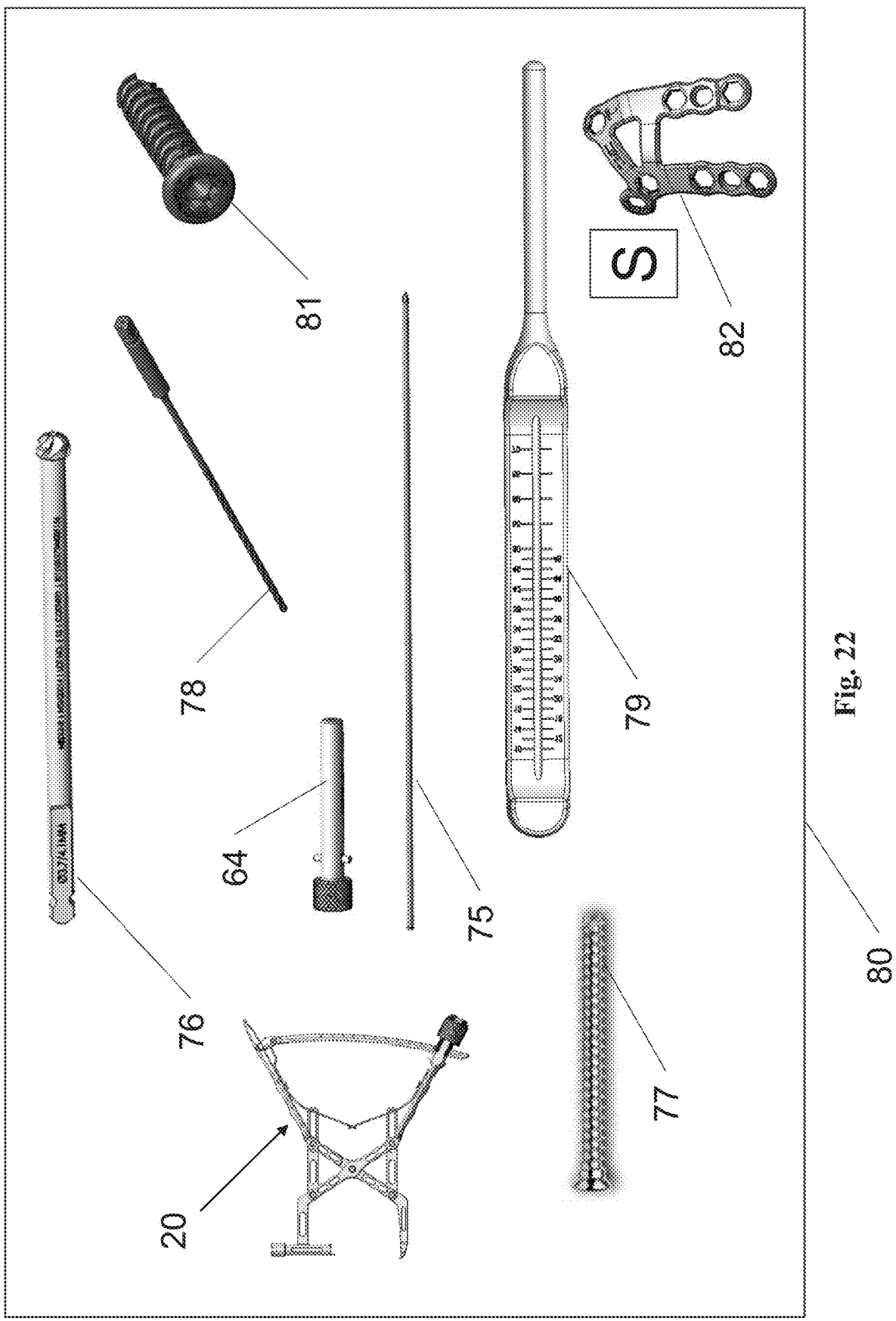
FIG. 22 is a representation of a kit that includes the Lisfranc reconstruction device shown in FIG. 1, a wire guide sleeve, a pilot wire, a cannulated Lisfranc screw, and a driver bit, these items not being to relative scale in FIG. 17.

As seen in FIG. 22, the components described herein may be supplied in the form of a kit that includes, in a container 80, a Lisfranc reconstruction device (shown as device 20), wire guide sleeve 64, pilot wire 75, countersink 76. Lisfranc screw 77 and/or 81, driver bit 78, and an optional wire depth gauge 79. The kit may optionally include other screws, staples, fasteners, and tools, for placement of additional devices in a Lisfranc reconstruction procedure. For example, Lisfranc reconstruction procedures sometimes entail placement of bone plates and plate securement screws, so the kit may be provided with titanium plate 82 and titanium screws (represented as S).

As an alternative to a screw, a different compression implement (not shown), such as a suture button, may be placed after compression of the Lisfranc region. A kit may include, in a container, the device, wire guide sleeve, pilot wire, and the alternative compression implement, in addition to the other components identified above.

The components of the kit may be made from any suitable materials. The Lisfranc reconstruction device, including the wire guide sleeve, may be made from stainless steel, for example, and the cannulated bone screw may be made from titanium or a titanium alloy. The pilot wire may be made from steel and the bit may be made from steel or any suitable metal. The kit may be packaged as a sterilized kit including a container and outer wrap (not shown) as is otherwise conventional.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A Lisfranc reconstruction device comprising:
   first and second operator grips, said first operator grip connected to a first link and said second operator grip connected to a second link, said first and second operator grips being movable relative to one another upon manual compression;
   a mechanical linkage coupling said first link and said second link to a first arm that includes a barrel and a second arm that includes a jaw, the mechanical linkage including at least a prismatic joint, the mechanical linkage converting motion of the first and second operator grips into relative translation of the barrel and jaw;
   a retention mechanism for retaining a relative position of the barrel and jaw relative to one another.

2. The Lisfranc reconstruction device of claim 1, said first and second operator grips being movable in an arcuate path relative to one another upon manual compression.

3. The Lisfranc reconstruction device of claim 1, said first and second grips being opposingly biased.

4. The Lisfranc reconstruction device according to claim 3, including a leaf spring biasing the first and second operator grips away from one another.

5. The Lisfranc reconstruction device according to claim 1, the retention mechanism including a curved ratchet.

6. The Lisfranc reconstruction device according to claim 1, the retention mechanism including a ratchet wheel.

7. The Lisfranc reconstruction device according to claim 1, the mechanical linkage including first and second prismatic joints coupling the first and second links to the first and second arms.

8. The Lisfranc reconstruction device according to claim 7, the first and second links being coupled to one another at a revolute joint.

9. The Lisfranc reconstruction device of claim 8, the mechanical linkage including first and second additional revolute joints cooperating with said first and second prismatic joints.

10. The Lisfranc reconstruction device according to claim 1, said barrel including a plurality of barrel teeth and said jaw including a plurality of jaw teeth.

11. A kit comprising the Lisfranc reconstruction device of claim 1, a pilot wire, and a wire guide sleeve.

12. A kit according to claim 11, including a Lisfranc screw.

13. A kit according to claim 12, said screw being a cannulated screw sized to be guided in a defined trajectory into position via the pilot wire.

14. A kit according to claim 11, the wire guide sleeve being removably connectable to the barrel.

15. A kit according to claim 11, further including a driver bit.

16. A method comprising:
    providing the Lisfranc reconstruction device of claim 1;
    positioning the jaw and barrel relative to one another in the region of a patient's Lisfranc joint complex in need of reconstruction;
    actuating the device by compressing the grips to cause relative translation of the barrel and jaw to thereby compress a portion of the Lisfranc joint complex therebetween;
    with a wire guide sleeve coupled to the barrel and with a pilot wire positioned within the wire guide sleeve, drilling a pilot hole;
    removing the wire guide sleeve; and
    installing a Lisfranc screw into the Lisfranc joint complex via said pilot hole.

17. A method according to claim 16, including placing the wire guide sleeve and the pilot wire into the barrel after actuation of the device.

18. A method according to claim 17, said Lisfranc screw comprising a cannulated screw, the method including guiding the screw into position over a trajectory defined by the pilot wire.

19. A method according to claim 16, the mechanical linkage of the Lisfranc reconstruction device including first and second prismatic joints coupling the first and second links to the first and second arms.

20. A method according to claim 19, the first and second links of the Lisfranc reconstruction device being coupled to one another at a revolute joint.

21. A method according to claim 20, the mechanical linkage including first and second additional revolute joints cooperating with said first and second prismatic joints.

22. A method according to claim 16, the retention mechanism of the Lisfranc reconstruction device including a curved ratchet.

23. A method according to claim 16, the barrel of the Lisfranc reconstruction device including a plurality of barrel teeth and the jaw of the Lisfranc reconstruction device including a plurality of jaw teeth.

* * * * *